United States Patent
Townsend et al.

(10) Patent No.: US 10,185,893 B2
(45) Date of Patent: Jan. 22, 2019

(54) METHOD AND APPARATUS FOR GENERATING TIME SERIES DATA SETS FOR PREDICTIVE ANALYSIS

(71) Applicant: Fujitsu Limited, Kawasaki-shi, Kanagawa (JP)

(72) Inventors: Joseph Townsend, High Wycombe (GB); Eduarda Mendes Rodrigues, Northwood (GB)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 15/440,629

(22) Filed: Feb. 23, 2017

(65) Prior Publication Data
US 2017/0249534 A1    Aug. 31, 2017

(30) Foreign Application Priority Data

Feb. 29, 2016 (GB) .................................. 1603472.0

(51) Int. Cl.
| | |
|---|---|
| G06K 9/00 | (2006.01) |
| G06K 9/62 | (2006.01) |
| G06K 9/66 | (2006.01) |
| G06N 3/04 | (2006.01) |
| G06N 3/08 | (2006.01) |

(52) U.S. Cl.
CPC ......... G06K 9/6256 (2013.01); G06K 9/6215 (2013.01); G06K 9/6261 (2013.01); G06K 9/66 (2013.01); G06N 3/04 (2013.01); G06N 3/08 (2013.01)

(58) Field of Classification Search
USPC ................................................ 382/124–127
See application file for complete search history.

(56) References Cited

U.S. PATENT DOCUMENTS

| | | | | |
|---|---|---|---|---|
| 2004/0052407 A1* | 3/2004 | Kawabe | ............. | G06K 9/00026 382/124 |
| 2009/0175539 A1* | 7/2009 | Jahromi | ............. | G06K 9/00026 382/181 |
| 2010/0002920 A1* | 1/2010 | Cosatto | ............. | G06K 9/00147 382/128 |

FOREIGN PATENT DOCUMENTS

EP    1 251 433 A2    10/2002

OTHER PUBLICATIONS

Zhu et al., "Predicting Stock Index Increments by Neural Networks: The Role of Trading Volume Under Different Horizons", Expert Systems with Applications, vol. 34, Issue 4, May 2008.

(Continued)

*Primary Examiner* — Alex Liew
(74) *Attorney, Agent, or Firm* — Staas & Halsey LLP

(57) ABSTRACT

A computer-implemented method of generating, from time-series data, a time-series of data sets for predictive analysis, comprises dividing the time-series data into evenly-sized overlapping segments of data, generating an image representing data for each segment, using the time-series data to determine a trend associated with each image, and storing each of the generated images and its associated trend as a data set. In some embodiments of the method the image from each stored data set is transformed into numerical vectors through a feature extraction process using a pre-trained convolutional neural network. The numerical vectors are stored in association with the data set, and the data sets and associated numerical vectors are used to predict the trend for a new time-series image which has been generated from any time-series data.

12 Claims, 8 Drawing Sheets

(56) References Cited

OTHER PUBLICATIONS

Schroff et al., "FaceNet: A Unified Embedding for Face Recognition and Clustering", Computer Vision Foundation, (2015), pp. 815-823.
Qian et al., "Stock Market Prediction with Multiple Classifiers", Applied Intelligence, Springer, vol. 26, Issue 1, Feb. 2007.
Prasad et al., "Deep Recurrent Neural Networks for Time-Series Prediction", IEEE, Aug. 15, 2014, pp. 1-19.
Peng et al., "Leverage Financial News to Predict Stock Price Movements Using Word Embeddings and Deep Neural Networks", Department of Electrical Engineering and Computer Science York University, Ontario, Canada, M3J, 1P3, arXiv:1506.07220v1 [cs.CE], Jun. 24, 2015, (5 pages).
Krollner et al. "Financial Time Series Forecasting with Machine Learning Techniques: A Survey", European Symposium on Artificial Neural Networks: Computational and Machine Learning, Bruges, Belgium, Apr. 2010, pp. 25-30.
Krizhevsky et al., "ImageNet Classification with Deep Convolutional Neural Networks", (2012), pp. 1-9.
Choudhry et al., "A Hybrid Machine Learning System for Stock Market Forecasting", World Academy of Science, Engineering and Technology 39, (2008) pp. 315-318, (5 pages in Uploaded Reference).
[Fama, E.F., "The Behavior of Stock-Market Prices" The journal of Business, 38(1), 1965, pp. 34-105] in Owidi et al., "Analysis of Asymmetric and Persistence in Stock Return Volatility in the Nairobi Securities Exchange Market Phases", Journal of Finance and Economics, Vo. 4 No. 3, (2016), retrieved Jan. 9, 2017 http://www.sciepub.com/reference/156187.
Deng et al., "ImageNet: A Large-Scale Hierarchical Image Database", Computer Vision and Pattern Recognition, CVPR 2009, IEEE Conference of Jun. 20-25, 2009.
Deng et al., "Deep Learning: Methods and Applications", Journal Foundations and Trends in Signal Processing, vol. 7, Issue 3-4, Jun. 2014.
De Gooijer et al., "25 Years of Time Series Forecasting", International Journal of Forecasting 22, 2006, pp. 443-473.
Busseti et al., "Deep Learning for Time Series Modeling", CS 229 Final Project Report, Dec. 14, 2012, pp. 1-5.
Bollen et al., "Twitter Mood Predicts the Stock Market", arXiv:1010.3003v1 [cs.CE], Oct. 14, 2010, pp. 1-8.
Gilberto Batres-Estrada, "Deep Learning for Multivariate Financial Time Series", May 2015, Cover Page, Abstract, pp. iv-vi and 1-88.
Atsalakis et al., "Forecasting Stock Market Short-Term Trends Using a Neuro-Fuzzy Based Methodology", Elsevier Ltd., Expert Systems with Applications 36, (2009), pp. 10696-10707 (13 Pages in Uploaded Reference).
Kyoung-Jae Kim, "Financial Time Series Forecasting Using Support Vector Machines", Elsevier Ltd., Neurocomputing 55, (2003), pp. 307-319.

* cited by examiner

| Image filename | W start date | $W_p$ end date | $W_f$ end date | $T_i$ |
Figure 5
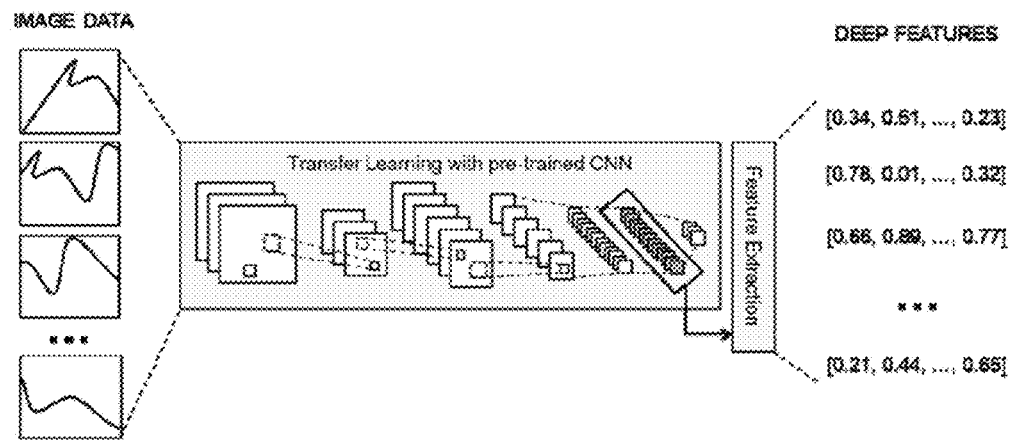
Figure 6
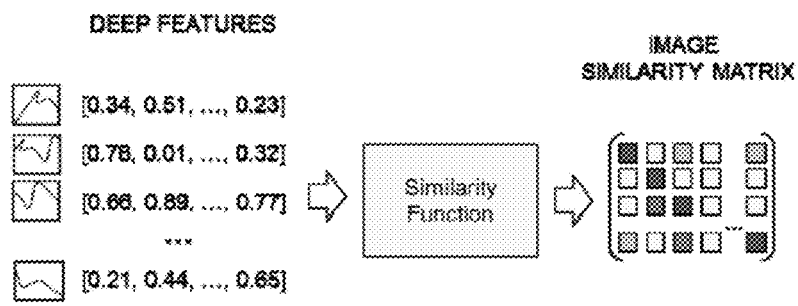
Figure 7

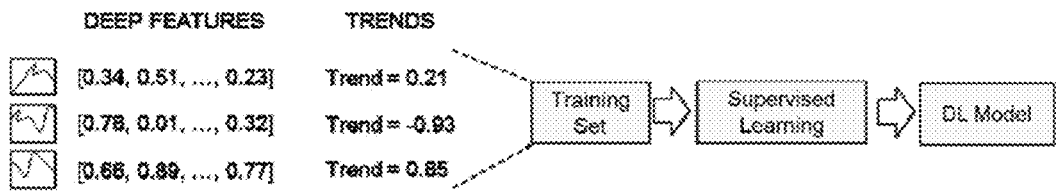
Figure 8
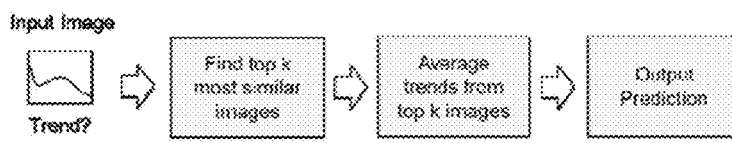
Figure 9
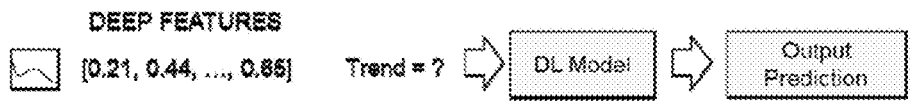
Figure 10
| 02/01/2014 | £51.98 |
|---|---|
| 03/01/2014 | £52.30 |
| 06/01/2014 | £50.40 |
| 07/01/2014 | £50.49 |
| 08/01/2014 | £50.36 |
| .... | .... |
| 31/12/2014 | £65.44 |
Figure 11

| Window W | Present Window $W_p$ | $W_p$ image | Future Window $W_f$ | Future trend $T_f$ |
|---|---|---|---|---|
| 51.98, 52.30, 50.40, 50.49, 50.36, 51.22, 50.90, 49.83, 50.60, 50.11, 50.5, 50.06, 50, 49.08, 48.87 | 51.98, 52.30, 50.40, 50.49, 50.36, 51.22, 50.90, 49.83, 50.60, 50.11 | | 50.5, 50.06, 50, 49.08, 48.87 | -0.1 |
| 50.49, 50.36, 51.22, 50.90, 49.83, 50.60, 50.11, 50.5, 50.06, 50, 49.08, 48.87, 47.79, 46.83, 47.69 | 50.49, 50.36, 51.22, 50.90, 49.83, 50.60, 50.11, 50.5, 50.06, 50 | | 49.08, 48.87, 47.79, 46.83, 47.69 | -0.3 |
| 50.90, 49.83, 50.60, 50.11, 50.5, 50.06, 50, 49.08, 48.87, 47.79, 46.83, 47.69, 47.61, 48.31, 49.23 | 50.90, 49.83, 50.60, 50.11, 50.5, 50.06, 50, 49.08, 48.87, 47.79 | | 46.83, 47.69, 47.61, 48.31, 49.23 | 0.4 |

Figure 12

| Image filename | W start date | $W_p$ end date | $W_f$ end date | $T_f$ |
|---|---|---|---|---|
| ABBV_2014-01-02_2014-01-15.png | 02/01/2014 | 15/01/2015 | 23/01/2014 | -0.1 |
| ABBV_2014-01-07_2014-01-21.png | 07/01/2014 | 21/01/2014 | 28/01/2014 | -0.3 |
| ABBV_2014-01-10_2014-01-24.png | 10/01/2014 | 24/01/2014 | 31/01/2014 | 0.4 |

Figure 13

| Image | Feature vector |
|---|---|
| | [0.01, 0.07, ... 0.45] |
| | [0.03, 0.12, ... 0.85] |
| | [0.10, 0.09, ... 0.07] |

Figure 14

METHOD AND APPARATUS FOR GENERATING TIME SERIES DATA SETS FOR PREDICTIVE ANALYSIS

CROSS-REFERENCE TO RELATED APPLICATIONS

This application claims the benefit of United Kingdom Application No. 1603472.0, filed Feb. 29, 2016, in the United Kingdom Intellectual Property Office, the disclosure of which is incorporated herein by reference.

BACKGROUND

1. Field

The embodiments relate to a method and apparatus for generating time series data sets for predictive analysis.

2. Description of the Related Art

Current attempts to predict future trends in time series data are based on r numerical data or mathematical transformations of that raw data. In some application domains where there is no clear pattern in the time series, such as stock market trend prediction, prediction accuracy is often relatively low.

Many machine learning approaches to time series prediction have been proposed in the past, for example on the basis of regression methods or neural networks. However, these approaches struggle on time series data which lack obvious patterns or trends. One example of such data is stock market time series data. Although many approaches to predicting the direction of stock market change are reported to outperform benchmark models, hit-rates (i.e. the percentage of accurate predictions out of all predictions made by a particular method) of 50% to 65% on test data are still fairly commonplace, the lower end of which range is equivalent to little more than random guessing.

It is desirable to improve the accuracy of time series prediction where patterns or trends in the data cannot easily be recognized.

SUMMARY

Additional aspects and/or advantages will be set forth in part in the description which follows and, in part, will be apparent from the description, or may be learned by practice of the embodiments.

According to an embodiment of a first aspect there is provided a computer-implemented method of generating, from time-series data, a time-series of data sets for predictive analysis, which method comprises; dividing the time-series data into evenly-sized overlapping segments of data; for each segment, generating an image representing data in the segment; using the time-series data to determine a trend associated with each image; and storing each of the generated images and its associated trend as a data set.

Data preparation for prediction analysis in accordance with an embodiment has reduced complexity as compared with that conventionally required, since it avoids the tradition pre-processing steps required when handling the raw data, such as differentiating, integrating, smoothing, extrapolating, noise removal, etc.

A method embodiment may further comprise transforming the image from each stored data set into numerical vectors through a feature extraction process using a pre-trained convolutional neural network, and storing the numerical vectors in association with the data set. Convolutional neural networks (CNNs) are well suited to performing image recognition, and can be pre-trained for classification of any image database, thereby facilitating the identification of similarity between images.

The data sets and associated numerical vectors may be used to predict the trend for new time-series image which has been generated from anytime-series data. For example, trends of contiguous time windows from historical data can be used for training a supervised or unsupervised learning method that is able to predict the trend label of the queried time window. In particular, the method may further comprise: deriving a trend prediction model from the numerical vectors and trends for each stored data set, or for a sub-set of the generated images, using a deep learning method; predicting the trend for the new time-series image using the derived trend prediction model; and outputting the predicted trend for the new time-series image.

Alternatively, the weighted average trend corresponding to the k most similar past images can be taken as a prediction of future trend of the queried time period. In particular, the method may further comprise determining, for each generated image or a sub-set of the generated images, the degree of similarity between that image and each of the other generated images, using the numerical vectors for the generated images. A preset number k of the generated images which are the most similar to the new time-series image, where k is an integer, may be identified and the trends associated with the k identified images may be used to determine an average trend, which is outputted as a predicted trend for the new time-series image.

According to an embodiment of a second aspect there is provided data processing apparatus configured to generate, from time-series data, a time-series of data sets for predictive analysis, which apparatus comprises data preparation means operable to: divide the time-series data into evenly-sized overlapping segments of data; for each segment, generate an image representing data in the segment; use the time-series data to determine a trend associated with each image; and store each of the generated images and its associated trend as a data set.

In apparatus embodiments the data preparation means may be further operable to transform the image from each stored data set into numerical vectors through a feature extraction process using a pre-trained convolutional neural network, and store the numerical vectors in association with the data set.

Apparatus embodiments may further comprise trend prediction means configured to use the data sets and associated numerical vectors to predict the trend for a new time-series image which has been generated from any time-series data.

In this case the apparatus may further comprise classifier training means operable to derive a trend prediction model from the numerical vectors and trends for each stored data set, or for a sub-set of the generated images, using a deep learning method, and the trend prediction means may be operable to predict the trend for the new time-series image using the derived trend prediction model and output the predicted trend for the new time-series image.

Alternatively, apparatus may further comprise classifier training means operable, in respect of each generated image or a sub-set of the generated images, to obtain image similarity results by determining the degree of similarity between that image and each of the other generated images, using the numerical vectors for the generated images.

In this case the trend prediction means are operable to: identify, using the image similarity results obtained by the classifier training means, a preset number k of the generated images which are the most similar to the new time-series image, where k is an integer; use the trends associated with the k identified images to determine an average trend; and output the average trend as a predicted trend for the new time-series image.

In a method or apparatus embodiment each segment may comprise contiguous first and second sub-segments of data, the data in the first sub-segment being used to generate the said image for the segment, and the data in the second sub-segment being used to determine the trend associated with the said image.

According to an embodiment of a third aspect there provided a computer program which, when run on a computer, causes that computer to carry out a method embodying the first aspect.

BRIEF DESCRIPTION OF THE DRAWINGS

Reference will now be made, by way, of example to the accompanying drawings, in which:

FIG. 5 shows an example of a look-up table for use in an embodiment;

FIG. 6 illustrates an image transformation stage which follows the initial processing stage in the apparatus;

FIG. 7 illustrates an image similarity computation process according to a first embodiment;

FIG. 8 illustrates a supervised learning process according to a second embodiment;

FIG. 9 illustrates trend prediction according to the first embodiment;

FIG. 10 illustrates trend prediction according to the second embodiment;

FIG. 11 is a table of data to be processed, for use in explaining the first and second embodiments in more detail;

FIG. 12 is a table showing the results of processing the data of FIG. 11 in accordance with an embodiment;

FIG. 13 is a look-up table for the results recorded in the table of FIG. 12;

FIG. 14 is a table showing feature vectors corresponding to the results shown in the table of FIG. 12;

DETAILED DESCRIPTION

Figure 1:
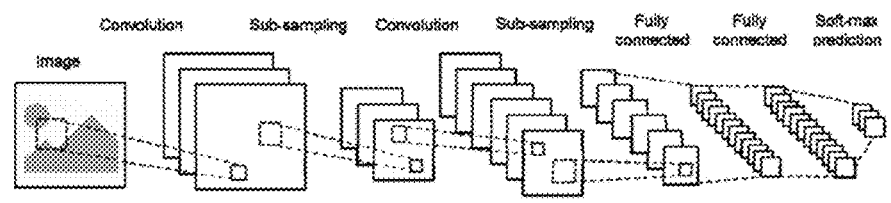
FIG. 1 shows an example of convolutional neural network architecture.

Reference will now be made in detail to the embodiments, examples of which are illustrated in the accompanying drawings, wherein like reference numerals refer to the like elements throughout. The embodiments are described below by referring to the figures.

This patent application presents a method and apparatus for generating time series data sets which can be used to facilitate prediction of the future trends (positive or negative) of the time series data. In one embodiment the method/apparatus can leverage the ability of convolutional neural networks (CNNs) to perform image recognition, and therefore identify the similarity between images.

A convolutional neural network is a multilayer neural network architecture comprising one or more convolutional layers, followed by sub-sampling layers (pooling) and one or more fully connected layers. CNNs are a form of Deep Learning and have been proven to perform very well in image classification tasks. Deep Learning (DL) is a machine learning method that learns multiple levels of representation for a given training data set. The method extracts more abstract and intrinsic characteristics of the data in the higher levels of the representation. The most common type of deep learning is performed with deep multilayer neural networks, but other architectures can be constructed.

Time series prediction using numerical data has proved to be difficult in some domains, for example finance, but in the present application we propose that the problem of predicting future trends in time series data can be solved by representing this data as images. In the present application we refer to the process of converting raw numeric time series data into a sequence of images representing plots of specific time windows, which may or may not overlap in time, depending on the parameters of the process, as "time series imagification" of the raw data. Complex features can be extracted from the images as feature vectors using a pre-trained convolutional neural network (CNN), and these feature vectors can be used as input of a prediction algorithm. The CNN can be pre-trained for classification of any image database. Given an image of time series data within a given time window, image similarity methods can be used to retrieve similar time series data from the past, taking as input the feature vectors extracted by the convolutional neural network. A trend associated with each image can be determined based on the raw time series data using a curve fitting function. The weighted average trend corresponding to the k most similar past images can then be taken as a prediction of future trend of the queried time period. Alternatively, trends of contiguous time windows from historical data can be used for training a supervised learning method that is able to predict the trend label of the queried time window.

In some embodiments input data (i.e. data for input into a neural network or other machine-learning based prediction system, from which a corresponding prediction will be made—images in the present case) and target data (i.e. the expected output corresponding to a given vector of input data—in the present case trends following the images) are generated for periodic segments of the time series. In other words, a 'meta-time-series', that is a time series of images of numerical time series data, is generated.

In the present application the term 'feature' is defined as a property of the data or phenomenon being observed. Features can have a numeric or categorical value and are usually represented as an N-dimensional vector space for algorithmic processing (where N corresponds to the overall number of features). The term "feature extraction" is defined in the present application as a data processing step where new features are derived by some transformation of the original raw data features. The goal is to establish an informative set of features that are able to represent the intrinsic properties of the data, while at the same time being sufficiently generic to avoid overfitting to a particular dataset.

An embodiment of the proposed method begins by iteratively cycling through all time series data available and storing plots of that data at regular overlapping intervals, or sliding windows shifted by a given amount of time. For each image, the trend over the following time window is also recorded. The trend can be expressed in a numerical form, (e.g. 0.21, −0.93, etc.) or in a categorical way (e.g. positive, neutral, negative).

All images produced are then fed into a pre-trained convolutional neural network (CNN), which transforms all images into numerical vectors through a process of feature extraction.

In one embodiment, in order to predict the trend following a given time series segment, a similarity measure is applied to the vector representation of the corresponding image, in order to retrieve the k most similar images from past data. The average trend which follows each of those images is then taken as the trend predicted to follow the queried time series segment. The average trend can be weighted by the degree of similarity of each associated image, or indeed by any other suitable mathematical function. For example, if a particular application is intended to favor more recent data, a time-decay exponential function could be used to give more weight to the most recent trends.

In an alternative embodiment, the trend prediction can also be implemented using a supervised learning method. In this case, a sample of past images and respective trends is used to train a supervised classifier that will learn how to predict future trend categorical labels (e.g., 1 for positive trend; 0 for neutral trend; or −1 for negative trend).

A method and apparatus will now be described in more detail.

Figure 2:
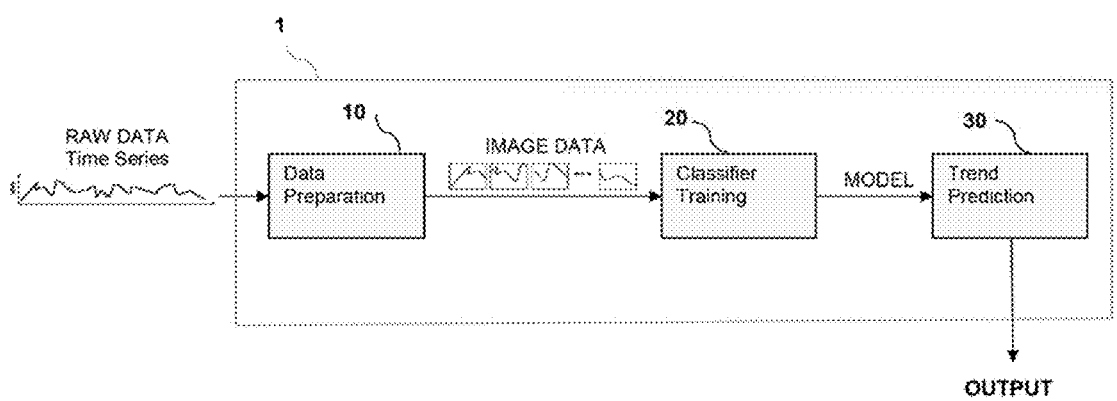
FIG. 2 shows a diagram of apparatus embodiment.

FIG. 2 shows data processing apparatus 1 implementing a time series prediction system based on image similarity and machine learning methods. As shown in FIG. 2, the apparatus may be split into three distinct stages: data preparation, classifier training, and trend prediction, as described below.

Data Preparation

In accordance with an embodiment a data preparation unit 10 (data preparation means) is operable to carry out a process of dividing time-series data into evenly-sized overlapping segments of data, generating an image representing data in each segment, using the time-series data to determine a trend associated with each image, and storing each of the generated images and its associated trend as a data set.

Figure 16:
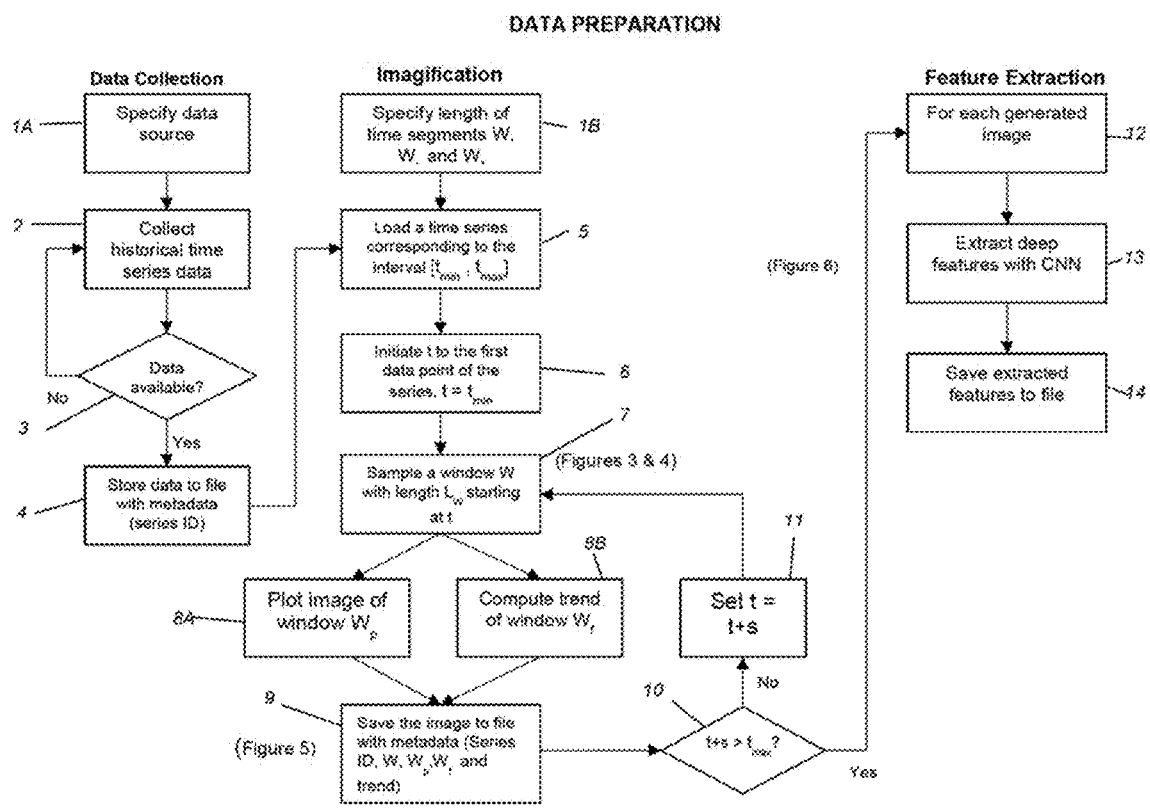
FIG. 16 is a flowchart illustrating the processes described with reference to FIGS. 3 to 6.

Data preparation, and feature extraction, will now be described with reference to FIGS. 3 to 6. FIG. 16 is a flowchart illustrating the processes described with reference to FIGS. 3 to 8.

Figure 3:
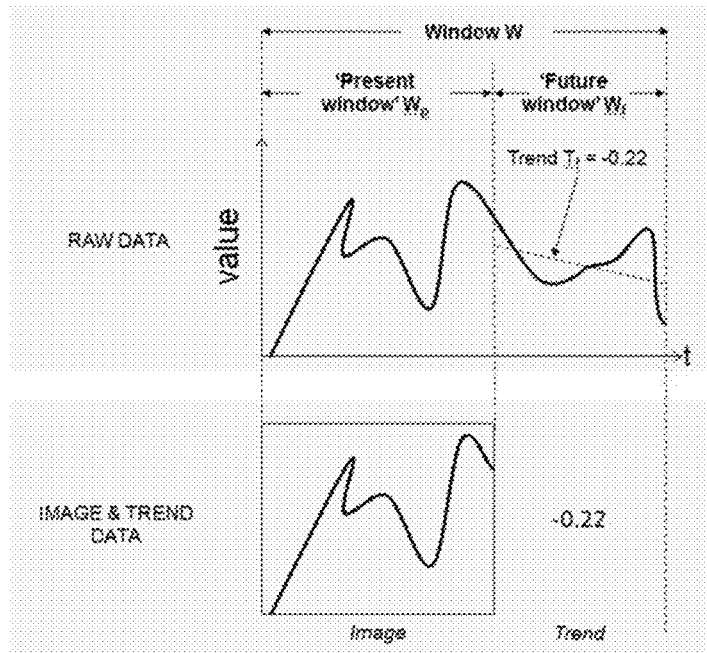
FIG. 3 illustrates an initial processing stage of raw time series data in the apparatus.

As illustrated in FIG. 3, an embodiment of the process begins by iteratively cycling through all time series data available and dividing it into regular overlapping intervals W, or sliding windows, shifted by a given amount of time s and with a window length of $L_W$. Each interval W is itself divided into two smaller windows: 'present window' $W_p$ of length $L_p$, and a 'future window' $W_f$ of length $L_f$. (steps 1A to 6)

The data within $W_p$ is transformed into an image depicting a plot of that data, and the data within Wf is used to calculate the trend $T_f$ of that data as the gradient of the line of best fit. The trend can be expressed in a numerical form, (e.g. 0.21, −0.93, etc.) or in a categorical way (e.g. positive, neutral, negative). In other words, Wp produces images on which similarities of time series data are to be compared, and Wf produces the future trend which follows the interval in which the corresponding image is generated.

Figure 4:
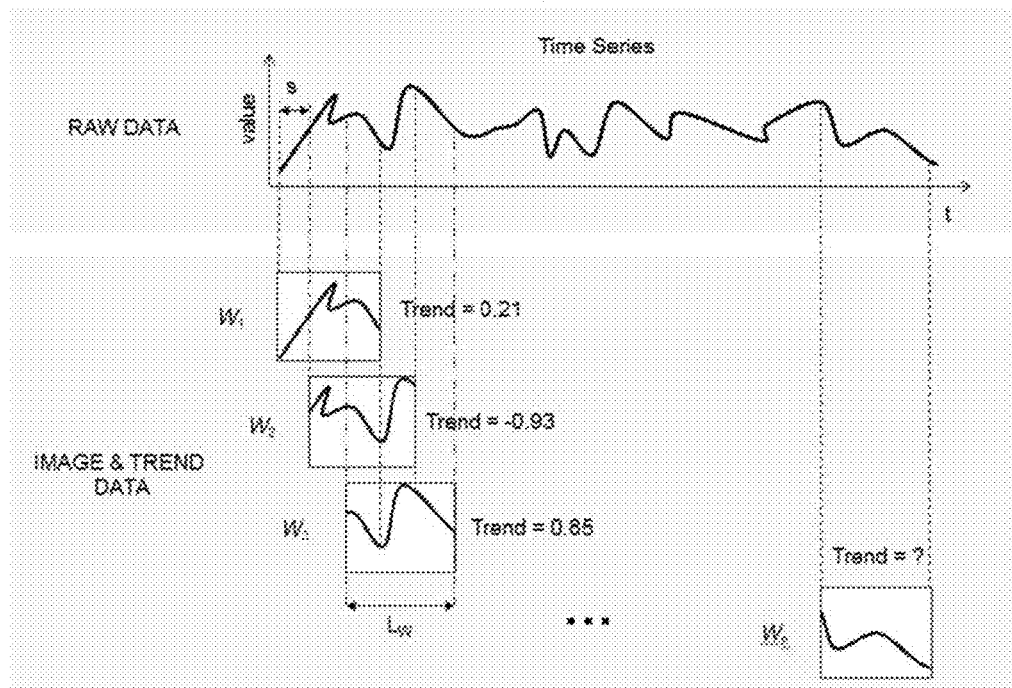
FIG. 4 further illustrates the initial processing of raw time series data in the apparatus.

As depicted in FIG. 4, time-series imagification, using a sliding-window method which takes n snapshots of overlapping time windows WI, with a time difference s and of length $L_W$, is repeated across the complete time series, shifting the position of W by the fixed amount of time s, until all data has been represented (note: the numerical values shown in the Figure are just for illustrative purposes). (Steps 7 to 11)

Preferably, all images are saved (step 9) so that they can be identified by the entity for which they represent the data, and the start and end dates of the plotted data. For example, in the domain of stock market prediction, AAPL_20150801_20150831.png presents a plot of the closing price for the stock AAPL (Apple Inc.) for the dates 1 Aug. 2015 to 31 Aug. 2015.

Data about each window W is written to a look-up table, for example with each row structured as shown in FIG. 5, in order to map each image to data recorded about the time period it represents.

The data preparation unit 10 of the present embodiment is also operable to transform the image from each stored data set into numerical vectors through a feature extraction process using a pre-trained convolutional neural network, and store the numerical vectors in association with the data set.

As depicted in FIG. 6, all images produced are then fed into a pre-trained convolutional neural network (CNN), which transforms all images into numerical vectors through a process of "deep" feature extraction (i.e. a machine learning technique whereby a model is trained to transform raw input data vectors into a new vector space). The extracted feature vectors correspond to the output of the last fully-connected layer of the neural network, although in an alternative implementation they could be extracted from any fully-connected layer (note: the numerical values shown in the diagram are just for illustrative purposes). (steps 12 to 14)

Classifier Training

Figures 17, 18:
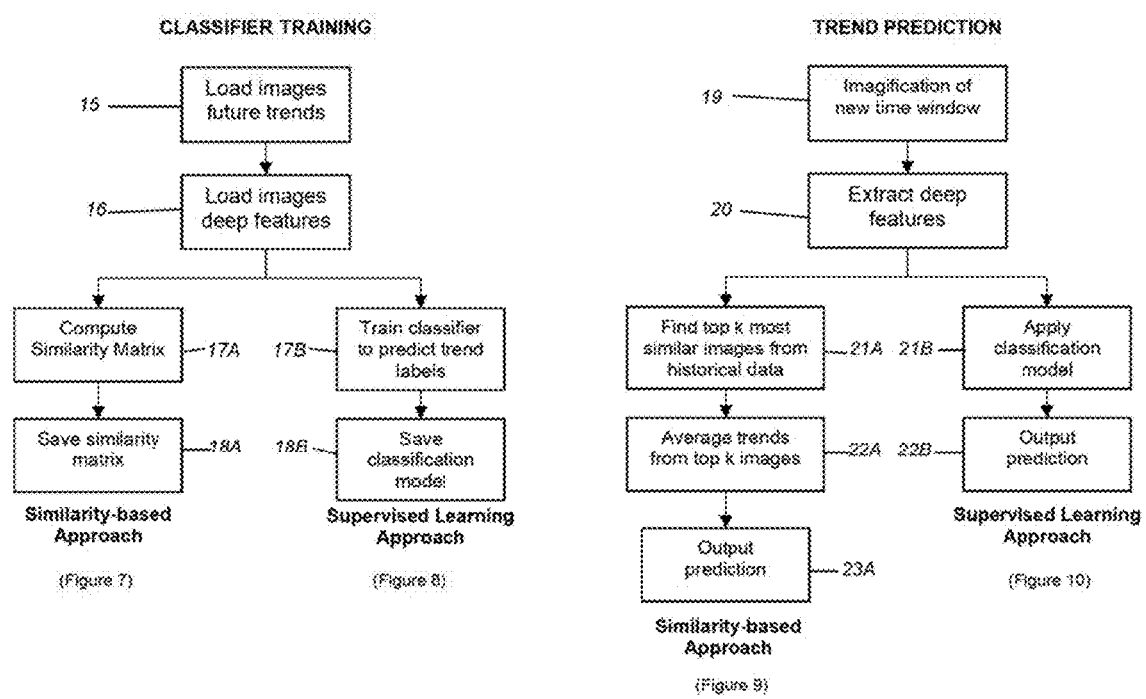
FIG. 17 is a flowchart illustrating the processes described with reference to FIGS. 7 and 8.
FIG. 18 is a flowchart illustrating the processes described with reference to FIGS. 9 and 10.

The data processing apparatus 1 of the present embodiment further comprises a classifier training unit 20 (classifier training means) operable to employ the numerical vectors as input for an image similarity computation process, as explained below with reference to FIG. 7, or a trend prediction learning process, as explained below with reference to FIG. 8 FIG. 17 is a flowchart illustrating the processes described with reference to FIGS. 7 and 8.

In particular, the classifier training unit 20 is operable to: (a) determine, in respect of each generated image or a sub-set of the generated images, the degree of similarity between that image and each of the other generated images, using the numerical vectors for the generated images; and/or (b) derive a trend prediction model from the numerical vectors and trends for each stored data set, or for a sub-set of the generated images, using a deep learning method. That is, the extracted 'deep' feature vectors are then used as input for a similarity search and/or trend prediction learning process.

Similarity search can be performed using a simple vector similarity measure, such as cosine distance, or with a basic machine learning algorithm, such as the k-Nearest Neighbors (a machine learning algorithm that can be used for automatic classification and regression tasks; a data item is classified according to the class of the k nearest neighbors, based on a vector similarity function, e.g. cosine measure), both of which will identify the top k most similar vectors (and therefore the top k most similar images) for a given time series image vector from a pool of past time series data. FIG. 7 illustrates an image similarity process based on 'deep' feature vectors extracted from the CNN. Elements with darker shade in the N×N similarity matrix signify higher similarity score (where N is the total number of time window images). (steps 15, 16, 17A, 18A)

The trend prediction can be numeric or categorical and can be performed using an unsupervised or a supervised learning approach. In the supervised learning approach, as illustrated in FIG. 8, the classifier training unit is trained using as training data the 'deep' feature vectors extracted using the CNN and the calculated trend values/labels provided by the data preparation unit and derives a 'deep' learning (DL) model for predicting future trend categorical labels (e.g. 1 for positive trend; 0 for neutral trend; or −1 for negative trend). (steps 15, 16, 17B, 18B)

Trend Prediction

The data processing apparatus 1 of the present embodiment further comprises a trend prediction, unit 30 (trend prediction means) configured to use the data sets and associated numerical vectors to predict the trend for a new time-series image which may or may not have been generated from the processed time-series data.

Processes carried out by the trend prediction unit will now be described with reference to FIGS. 9 and 10. FIG. 18 is a flowchart illustrating the processes described with reference to FIGS. 9 and 10.

Firstly a new time-series image is derived from a new time window and "deep" features re extracted from the image. (steps 19, 20)

In one embodiment, the trend prediction unit is operable to identify, using the image similarity results determined by the classifier training unit, a preset number k of the generated images which are the most similar to the new time-series image, where k is an integer; use the trends associated with the k identified images to determine an average trend, and output the average trend as a predicted trend for the new time-series image.

In particular, as illustrated in FIG. 9, in order to predict the future trend following a particular time series segment, the similarity measure may be used to retrieve the k most similar images ("top k-nearest neighbor images") to the plot of that segment. The future trend prediction for the queried segment is taken as the average trend (positive, neutral or negative) associated with each of the k similar images. (steps 21A, 22A, 23A)

In an alternative embodiment the trend prediction unit is operable to predict the trend for the new time-series image using the derived trend prediction model and output the predicted trend for the new time-series image.

In particular, the trained DL model ("supervised learning approach") is used for the prediction of the future trend, as illustrated in FIG. 10. In this the 'deep' feature vector is extracted for the queried time segment from the CNN. This vector is then passed through the DL model which outputs a prediction of the trend, (steps 21B, 22B)

A particular example of how an embodiment may be put into effect will now be described. In this case the example used is that of predicting stock market trends, but it will be noted that embodiments may be applied to data preparation and trend prediction in other fields.

The time series in FIG. 11 is a set of closing prices for ABBV (AbbVie Inc.) stocks for each trading day from 2 Jan. 2014 to 31 Dec. 2014.

Firstly, the input data and target data is prepared from the time series of FIG. 11 accordance with the data preparation method described earlier, using the parameters $L_p=10$, $L_f=5$, s=3 (other parameter values could have been selected, depending on the specific application), the first three images and trends recorded for this data are given in FIG. 12, and the values from FIG. 12 are stored in the look-up table shown in FIG. 13.

All the stock market time series images produced are then fed into a pre-trained convolutional neural network (CNN), which transforms all images into numerical vectors through a process of feature extraction as shown in FIG. 14 (note: the numerical values shown in the diagram are just for illustrative purposes). This example illustrates the extraction of the 'deep' feature vectors.

Figure 15:
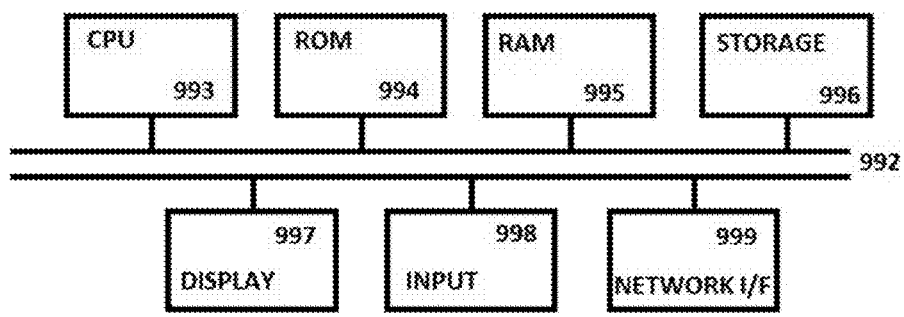
FIG. 15 is a table showing the results of a trend prediction process carried out on the results recorded in FIG. 12.

For a provided query image the similarity measure, for example, can be used to retrieve the k-most similar images, along with the associated trends of the periods which follow each image, as shown for example in FIG. 15. FIG. 15 shows the k-most similar images, and associated trends, discovered for the query image ACE_2014-08-122014-08-25.png, which plots stock prices for trading days between 12 Aug. 2104 and 25 Aug. 2014. The following trend for the query image is then calculated as the average trend of the k-most similar images.

Using the example in FIG. 15, the predicted trend over the $L_f=5$ days following 25 Aug. 2014 takes the value (0.92+0.87+0.79+0.91)/4=0.8725.

An embodiment can be applied to any time series prediction problem, examples of which are mentioned below (but are not limited thereto).

For example, in addition to stock market prediction, other financial applications include exchange rate prediction and bit-coin price prediction, or indeed predicting any KPI (key performance indicators) that are time-series based. This may also be applied to other commercial areas such as predicting sales figures, profits, losses, etc.

Other possible applications include prediction of social media trends, such as the number of posts on a certain topic, the number of users posting about that same topic, etc.

The embodiments also provide means of performing prediction and analysis on audio waveforms, or data collected from a range of different devices, such as wearables and smart devices.

Although the embodiments described herein include the prediction of trends from images prepared from time series data in accordance with the embodiments, the mere retrieval of images of similar trends in past data will also be useful to those people who wish to employ these images to make their own expert analysis.

For example, the image similarity search approach in itself is a useful tool for data analysts, even if they do not wish to rely on a machine prediction. The ability to retrieve time series segments of similar past behavior will be useful to experts in discovering data on which to form their own analysis and predictions. Information about dates corresponding to similar images can be found in the lookup table.

Figure 19:
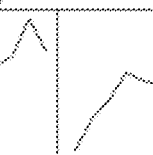
FIG. 19 is a block diagram of a computing device suitable for carrying out a method embodiment

FIG. 19 is a block diagram of a computing device, such as a data storage server, and which may be used to implement a method of an embodiment and perform the tasks of apparatus of an embodiment. The computing device comprises a computer processing unit (CPU) 993, memory, such as Random Access Memory (RAM) 995, and storage, such as a hard disk, 996. Optionally, the computing device also includes a network interface 999 for communication with other such computing devices of embodiments. For example, an embodiment may be composed of a network of such computing devices. Optionally, the computing device also includes Read Only Memory 994, one or more input mechanisms such as keyboard and mouse 998, and a display unit such as one or more monitors 997. The components are connectable to one another via a bus 992.

The CPU 993 is configured to control the computing device and execute processing operations. The RAM 995 stores data being read and written by the CPU 993. The storage unit 996 may be, for example, a non-volatile storage unit, and is configured to store data.

The display unit 997 displays a representation of data stored by the computing device and displays a cursor and dialog boxes and screens enabling interaction between a user and the programs and data stored on the computing device. The input mechanisms 998 enable a user to input data and instructions to the computing device.

The network interface (network I/F) 999 is connected to a network, such as the Internet, and is connectable to other such computing devices via the network. The network I/F 999 controls data input/output from/to other apparatus via the network.

Other peripheral devices such as microphone, speakers, printer, power supply unit, fan, case, scanner, trackball etc may be included in the computing device.

Methods of the embodiments may be carried out on a computing device such as that illustrated in FIG. 19. Such a computing device need not have every component illustrated in FIG. 19, and may be composed of a subset of those components. A method of an embodiment may be carried out by a single computing device in communication with one or more data storage servers via a network. The computing device may be a data storage itself storing at least a portion of the data. A method of an embodiment may be carried out by a plurality of computing devices operating in cooperation with one another. One or more of the plurality of computing devices may be a data storage server storing at least a portion of the data.

Embodiments may be implemented in hardware, or as software modules running on one or more processors, or on a combination thereof. That is, those skilled in the art will appreciate that a microprocessor or digital signal processor (DSP) may be used in practice to implement some or all of the functionality described above.

The embodiments may also be embodied as one or more device or apparatus programs (e.g. computer programs and computer program products) for carrying out part or all of the methods described herein. Such program embodiments may be stored on non-transitory computer-readable storage media, or could, for example, be in the form of one or more non-transitory signals. Such signals may be data signals downloadable from an Internet website, or provided on a carrier signal, or in any other form.

The above-described embodiments may advantageously be used independently of any other of the embodiments or in any feasible combination with one or more others of the embodiments.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A computer-implemented method of generating, from time-series data, a time-series of data sets for predictive analysis, which method comprises:
    dividing the time-series data into evenly-sized overlapping segments of data;
    for each segment, generating an image representing data in the segment producing generated images;
    using the time-series data to determine a trend associated with each image;
    storing each of the generated images and the trend associated with each image as a data set;
    transforming each image from each stored data set into numerical vectors through a feature extraction process using a pre-trained convolutional neural network, and storing numerical vectors in association with the data set; and
    using the data sets and associated numerical vectors to predict the trend for a new time-series image which has been generated from other time-series data.

2. A method as claimed in claim 1, further comprising:
    deriving a trend prediction model from the numerical vectors and trends for one of each stored data set and a sub-set of generated images, using a deep learning method;
    predicting the trend for the new time-series image using the trend prediction model derived; and
    outputting a predicted trend for the new time-series image.

3. A method as claimed in claim 1, further comprising determining, for one of each generated image and a sub-set of generated images, a degree of similarity between generated image and each of other generated images, using the numerical vectors for the generated images.

4. A method as claimed in claim 3, further comprising:
    identifying a preset number k of the generated images which are a most similar to the new time-series image, where k is an integer;
    using the trends associated with k identified images to determine an average trend; and
    outputting the average trend as a predicted trend for the new time-series image.

5. A method as claimed in claim 1, wherein each segment comprises contiguous first and second sub-segments of data, data in the first sub-segment being used to generate the image for the segment, and data in the second sub-segment being used to determine the trend associated with the image.

6. Data processing apparatus configured to generate, from time-series data, a time-series of data sets for predictive analysis, the apparatus comprising:
    data preparation means for:
    dividing the time-series data into evenly-sized overlapping segments of data;
    for each segment, generating an image representing data in the segment producing generated images;
    using the time-series data to determine a trend associated with each image;
    storing each of the generated images and the trend associated with each image as a data set; and
    transforming each image from each stored data set into numerical vectors through a feature extraction process using a pre-trained convolutional neural network, and store numerical vectors in association with the data set;
    and trend prediction means for using the data sets and associated numerical vectors to predict the trend for a new time-series image which has been generated from other time-series data.

7. Apparatus as claimed in claim 6, further comprising:
    classifier training means for deriving a trend prediction model from the numerical vectors and trends for one of each stored data set and a sub-set of generated images, using a deep learning method;
    wherein the trend prediction means predict the trend for the new time-series image using the trend prediction model derived and output a predicted trend for the new time-series image.

8. Apparatus as claimed in claim 6, further comprising classifier training means for obtaining, in respect of one of each generated image and a sub-set of generated images, image similarity results by determining a degree of similarity between-the generated image and each of other generated images, using the numerical vectors for the generated images.

9. Apparatus as claimed in claim 8, wherein the trend prediction means:
- identify, using the image similarity results obtained by the classifier training means, a preset number k of the generated images which are a most similar to the new time-series image, where k is an integer;
- use the trends associated with k identified images to determine an average trend; and
- output the average trend as a predicted trend for the new time-series image.

10. Apparatus as claimed in claim 6, wherein each segment comprises contiguous first and second sub-segments of data, and data preparation means use data in the first sub-segment to generate the image for the segment, and use data in the second sub-segment to determine the trend associated with the image.

11. A non-transitory computer-readable storage medium including a computer program which, when run on a computer, causes the computer to carry out the method of claim 1.

12. Data processing apparatus as claimed in claim 6, wherein the data preparation means comprises a computing device.

* * * * *